US009120960B2

(12) United States Patent
Bakshi et al.

(10) Patent No.: US 9,120,960 B2
(45) Date of Patent: Sep. 1, 2015

(54) COMPOSITE SLURRIES OF NANO SILICON CARBIDE AND ALUMINA

(75) Inventors: Abhaya K. Bakshi, Westford, MA (US); Isaac K. Cherian, Shrewsbury, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 959 days.

(21) Appl. No.: 12/286,980

(22) Filed: Oct. 3, 2008

(65) Prior Publication Data

US 2009/0098807 A1   Apr. 16, 2009

Related U.S. Application Data

(60) Provisional application No. 60/997,982, filed on Oct. 5, 2007.

(51) Int. Cl.
*C09K 3/14* (2006.01)
*C09G 1/02* (2006.01)

(52) U.S. Cl.
CPC ............... *C09K 3/1463* (2013.01); *C09G 1/02* (2013.01); *C09K 3/1409* (2013.01); *C09K 3/1436* (2013.01)

(58) Field of Classification Search
CPC ................................ C09G 1/02; C09K 3/1463
USPC .................................................. 51/308; 106/3
See application file for complete search history.

(56) References Cited

U.S. PATENT DOCUMENTS

| 4,959,113 A * | 9/1990 | Roberts ......................... 216/89 |
| 5,190,897 A * | 3/1993 | Azumi ........................... 501/81 |
| 6,896,591 B2 * | 5/2005 | Chaneyalew et al. ........... 451/41 |
| 2001/0034191 A1 * | 10/2001 | Nojo et al. .................... 451/41 |
| 2003/0064596 A1 * | 4/2003 | Lee et al. ...................... 438/692 |
| 2003/0162399 A1 * | 8/2003 | Singh ........................... 438/692 |

FOREIGN PATENT DOCUMENTS

WO   WO-01/32799   5/2001
WO   WO-2006/115581   11/2006

OTHER PUBLICATIONS

Ha et al. "processing and properties Al2O3/SiC nanocomposite coated alumina by slurry dipcoating", Journal of materials science letters 17(1988) 747-749.*
Deng et al. "Fracture-mode Change in Alumina—Silicon Carbide Composites Doped with Rare—earth Impurities", J. Am Chem. Sci., 86[10] 1789-92(2003).*
International Search Report for Related International Application No. PCT/US2008/078767 (3 pages).
Written Opinion for Related International Application No. PCT/US2008/078767 (6 pages).
Database WPI Week 200612, Thomson Scientific, London, GB; AN 2006-112608 & IN DEL9 901458 A, Jan. 13, 2006, XP 002520102.

* cited by examiner

*Primary Examiner* — Shuangyi Abu Ali
(74) *Attorney, Agent, or Firm* — Abel Law Group, LLP; Adam Keser (57) ABSTRACT

Improved slurry compositions comprising silicon carbide particles and alumina particles dispersed within an aqueous medium. Slurry compositions in the form of abrasive slurry compositions for use chemical mechanical planarization (CMP) processes, particularly abrasive slurry compositions for polishing of sapphire, and methods of use.

18 Claims, 4 Drawing Sheets

FIG. 1

Table 1: Material removal rate of C-Plane Sapphire at pH 11.2

| Slurry | MRR (um/hr) |
|---|---|
| Alumina 9240-0.2um | 11 |
| Composite Slurry: 70% Alumina, 30% n SiC | 11.85 |
| Composite Slurry: 70% Alumina, 30% n SiC | 10.8 |

PROPERTIES OF SAPPHIRE

| PHYSICAL | | THERMAL | |
|---|---|---|---|
| Chemical formula | $Al_2O_3$ | Thermal conductivity (60° to c-axis) at 25°C | 0.065 cal cm$^{-1}$ s$^{-1}$ °C$^{-1}$ |
| Crystal structure | Hexagonal system (rhombohedral) | Thermal expansion coefficient (60° to c-axis) 25-800°C | 8.40 x 10$^{-6}$ °C$^{-1}$ |
| Unit cell dimension | a = 4.758 Å, c = 12.991Å | Specific heat at 25°C | 0.10 cal g$^{-1}$ |
| Density | 3.98 g cm$^{-3}$ | Heat capacity at 25°C | 18.6 cal °C$^{-1}$ mol$^{-1}$ |
| Hardness | 9 mohs, 1525-2000 Knoop | | |
| Melting Point | 2040°C | | |
| Boiling point | 2980°C | | |
| MECHANICAL (psi = 6.9 kPa) | | ELECTRICAL | |
| Tensile stregnth | 40,000-60,000 psi (design criterion) | Volume resistivity | 10$^{14}$ Ohm-cm |
| Flexural stregnth | 70,000-130,000 psi (design criterion) | Dielectric strength | 480,000 V cm$^{-1}$ |
| Young's modulus | 50x10$^6$ psi | Dielectric constant E perpendicular to c-axis E parallel to c-axis | 9.4 |
| Compressive modulus | 55x10$^6$ psi | | |
| Flexural modulus | 52x10$^6$ psi | | 11.5 |
| Rigidity modulus | 21.5x10$^6$ psi | Dissipation factor, *tan delta* | 10$^{-4}$ |
| Volumetric modulus of elasticity (bulk modulus) | 35x10$^6$ psi | | |
| Poisson's ratio | 0.29 | | |

FIG. 5

COMPOSITE SLURRIES OF NANO SILICON CARBIDE AND ALUMINA

The present application claims the benefit of U.S. provisional application No. 60/997,982 filed Oct. 5, 2007, which is incorporated by reference herein in its entirety.

FIELD OF THE INVENTION

The present invention generally relates to improved slurry compositions, and more particularly to composite slurry compositions comprising silicon carbide and alumina particles. In some embodiments, the slurry compositions are abrasive slurry compositions. Such abrasive slurry compositions are particularly suitable for polishing sapphire wafers, particularly C-plane wafers. The present invention also provides methods of making the slurry compositions and methods for planarizing and polishing a surface using the compositions.

BACKGROUND OF THE INVENTION

Sapphire is the single-crystal form of aluminum oxide ($Al_2O_3$) possessing excellent optical, mechanical, and chemical properties. For example, sapphire retains its high strength at high temperatures, has good thermal properties, excellent transparency, excellent chemical stability, possesses chip resistance, durability, scratch resistance, radiation resistance, and flexural strength at elevated temperatures.

For extreme conditions such as those found in high-temperature or harsh chemical environments, the unique properties of sapphire make at a cost-effective solution for those applications where long life and high performance are a must. Sapphire is widely used for various electronic and optical parts, test and analytical applications (e.g. NMR spectroscopy, thermo-optical temperature measurement, mass spectroscopy, biological and chemical sample analysis, sensor windows, FLIR, spectroscopy, and IR), lamps and lamp envelopes (e.g. electronic infrared countermeasures, ultraviolet sterilization, and high-intensity lamps).

Sapphire is increasingly becoming the material of choice for engineers faced with design challenges in the semiconductor manufacturing industry. For example, the properties provided by sapphire make it suitable for use in plasma containment tubes, process gas injectors, thermocouple protection assemblies, viewports and sight windows, end effectors, gas diffusion plates, substrates, and wafers.

Figure 4:
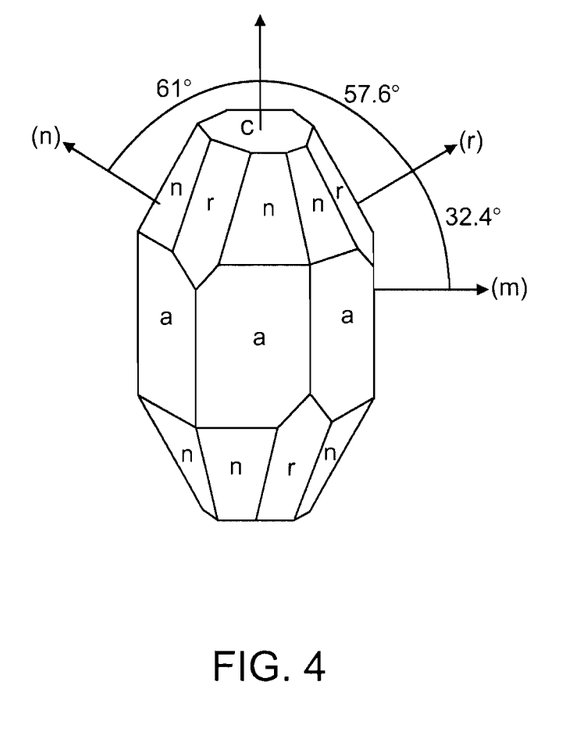
FIG. 4 demonstrates the C-plane, A-plane, and R-plane of sapphire.
Figure 5:
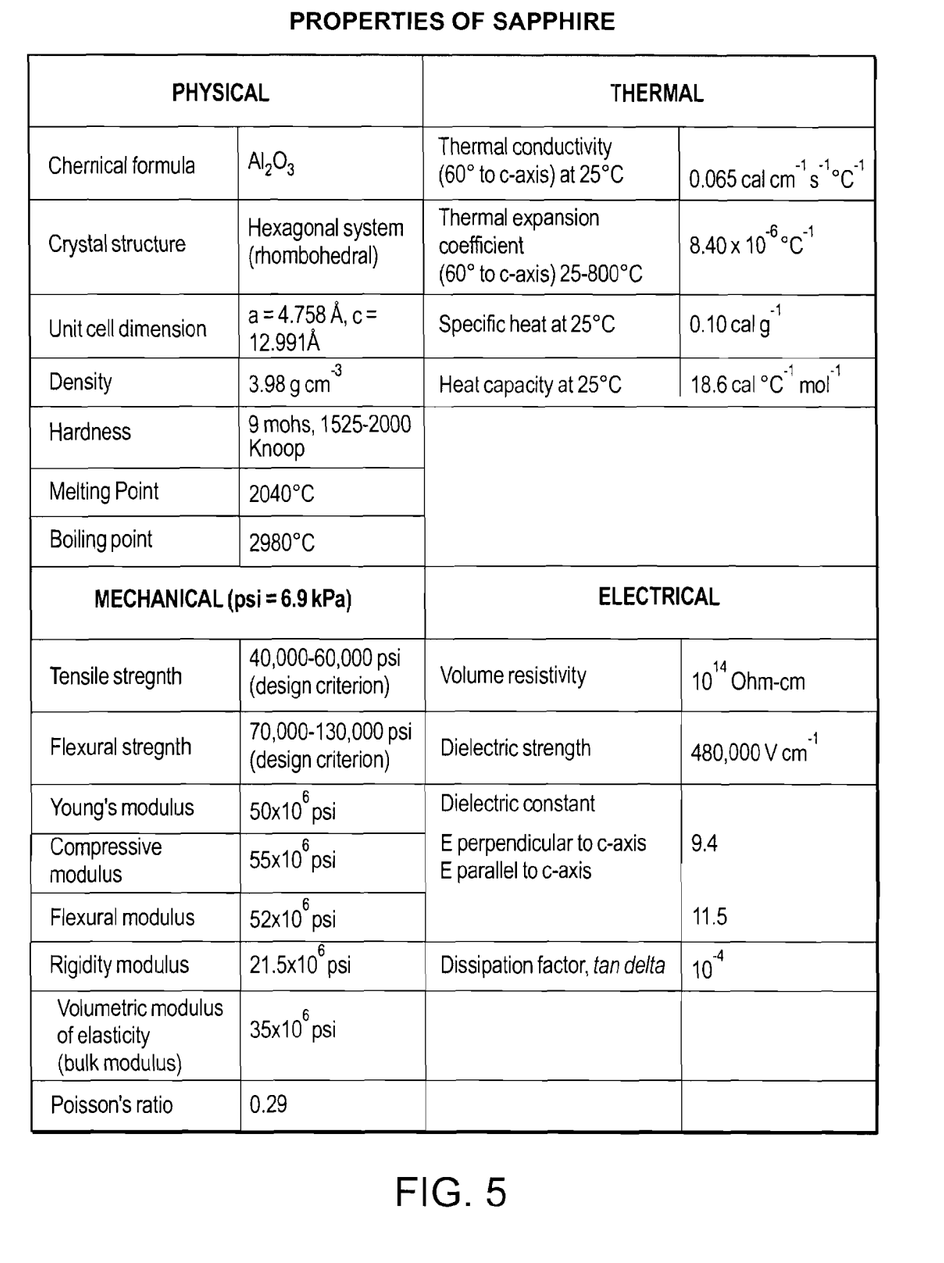
FIG. 5 sets forth a table of some average values for the different orientations of sapphire.

Sapphire has a rhombohedral type structure and is a highly anisotropic material, with properties that are largely dependent on crystallographic orientation. The properties shown in the table of FIG. 4 are average values for different orientations.

Sapphire wafers are typically cut along a crystallographic axis such as the C-plane (0001) which is also referred to as the zero-degree plane, A-plane (1120) which is also referred to as the 90 degree plane, and R-plane (1102) which is 57.6 degrees from the C-plane.

C-plane sapphire substrates are used to grow III-V and II-VI compounds such as GaN for blue LED and laser diodes. In addition, C-plane sapphire is useful for infrared detector applications and optical systems.

R-plane sapphire substrates are used for the hetero-epitaxial deposition of silicon for microelectronic IC, semiconductor, microwave and pressure transducer applications. R-plane sapphire is also an excellent choice for hybrid substrates such as microwave IC's because of its high dielectric constant. In addition, when filmed with an epitaxial silicon process, high speed IC and pressure transducers can be created. R-plane sapphire is also useful in growing thallium, other superconducting components, high impedance resistors, GaAs, and provide a stable platform for carrying or bonding other materials. R-plane sapphire has been found to be approximately 4 times more resistant to polishing than C-plane sapphire.

A-plane sapphire substrates provide a uniform dielectric constant and high insulation for hybrid microelectronic applications. Further, high Tc superconductors can be grown with A-plane sapphire substrates.

While sapphire provides numerous advantages, due to sapphire's hardness and resistance to chemical attack, polishing and planarizing sapphire presents many difficulties. Hard abrasives having high removal rates are often required to provide acceptable polishing rates. However, these abrasives can scratch and damage the sapphire surface. While softer, slower acting abrasives can be used to reduce this potential for scratching and damage, the downside with such abrasives is the often unacceptable times required to achieve the desired level of surface polishing and panarization.

Given these and other deficiencies observed in the art, it would be highly desirable to develop improved abrasive slurry compositions that provide fast removal rate while still minimizing defects and scratching.

SUMMARY OF THE INVENTION

This invention provides improved slurry compositions. In some embodiments, the slurry compositions are in the form of abrasive slurry compositions. The abrasive slurry compositions solve the deficiencies of conventional compositions. The present compositions greatly improve polishing and planarization performance and efficiency in planarizing and polishing a variety of surfaces. The present compositions reduce surface defects while attaining excellent planarity with high material removal rate.

In one aspect, the invention generally relates to a slurry composition comprising particles dispersed in an aqueous medium. The particles comprise a mixture of silicon carbide particles and alumina particles.

Embodiments according to this aspect of the invention can include the following features. The silicon carbide particles can have an average particle size no greater than 300 nm. The silicon carbide particles can have an average particle size ranging from about 40 nm to about 300 nm. The alumina particles can have an average particle size no greater than 300 nm. The alumina particles can have an average particle size ranging from about 40 nm to about 300 nm. The slurry can contain at least about 15 wt % particles. The composition can comprise from about 5 wt % to about 30 wt % abrasive particles. The composition can comprise at least about 1% silicon carbide particles. The composition can comprise from about 1 wt % to about 5 wt % silicon carbide particles. The composition can comprise at least about 5 wt % alumina particles. The composition can comprise from about 5 wt % to about 30 wt % alumina particles. The composition can comprise from about 1 wt % to about 20 wt % silicon carbide particles and from about 5 wt % to about 30 wt % alumina particles. The composition can comprise about 30 wt % silicon carbide particles and about 70 wt % alumina particles. The pH of the slurry composition can range from about 8 to about 12. The slurry composition can be an abrasive slurry composition. The abrasive slurry composition can be a composition suitable for polishing sapphire wafers. The abrasive slurry composition can comprises an amount of silicon carbide particles sufficient to increase the rate of C-plane sapphire polishing to a particular surface roughness by at least 10% relative to the rate of the composition without silicon carbide particles.

In another aspect, the invention generally relates to a method for polishing sapphire comprising abrading the sapphire surface with a slurry composition comprising silicon carbide and a second distinct abrasive agent. In some embodiments, the second abrasive agent is alumina.

Other aspects and advantages of the invention will become apparent from the following description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DESCRIPTION

The slurry compositions of the present invention comprise a mixture of silicon carbide particles and alumina particles. The combination of silicon carbide and alumina is particularly advantageous for many applications.

In some embodiments, the slurry compositions provided by the present invention are abrasive slurry compositions suitable for use in various polishing and planarization processes including CMP, pre-polishing step for stock removal, texturing, etc. Such processes can be used to polish and planarize the surfaces of various materials including the various layers in semiconductor devices. Some examples of semiconductor materials that the present slurries can be used to polish and planarize include sapphire ($Al_2O_3$), diamond (C), silicon (Si), germanium (Ge), silicon carbide (SiC), silicon germanide (SiGe), aluminum antimonide (AlSb), aluminum arsenide (AlAs), aluminum nitride (AlN), aluminum phosphide (AlP), boron nitride (BN), boron arsenide (BAs), gallium antimonide (GaSb), gallium arsenide (GaAs), gallium nitride (GaN), gallium phosphide (GaP), indium antimonide (InSb), inidium arsenide (InAs), indium nitride (InN), and indium phosphide (InP). Thus, the disclosure to follow should be construed as illustrative rather than in a limiting sense. For example, while certain combinations of materials and concentrations may be provided, such combinations of materials and concentrations are based on CMP processing of sapphire surfaces, and could be suitably modified for other types of processes and for polishing and planarizing various materials.

In some embodiments, the slurry compositions of the present invention are in the form of abrasive slurry compositions particularly suitable for polishing and planarizing sapphire, particularly C-plane wafers. These slurries provide smooth topographies and uniform thicknesses required in the formation of C-plane sapphire wafers. The present abrasive slurry compositions can provide benefits similar to those demonstrated herein with C-plane sapphire when used to polish A-plane and R-plane sapphire wafers, particularly when compared to the use of pure alumina slurries or silicon carbide slurries. It is further believed that the present slurry compositions will provide advantages similar to those demonstrated with C-plane sapphire when used to polish silicon carbide and galium nitride substrates.

The silicon carbide (SiC) abrasive of the present slurries can be any commercially available silicon carbide particles. The particle size of the silicon carbide is not particularly limited. For example, when the slurries are abrasive slurries, in general, very small particle size can result in an unacceptably low polishing rate, while particles that are too large can scratch the surface of the article being polished. In some embodiments, the silicon carbide particles are nano-sized and, for example, the silicon carbide particles can have a particle size of no greater than about 300 nm. In some embodiments, the particle size of the silicon carbide particles is no greater than about 200 nm. In other embodiments, the particle size ranges from about 40 nm to about 300 nm, and in some embodiments from about 70 nm to about 200 nm, and other embodiments from about 100 nm to about 150 nm.

In some embodiments, at least some of the silicon carbide particles behave similar to silica and, for example, possess properties similar to silica. In some embodiments, the silicon carbide is formed using the Acheson process or similar known processes. In some embodiments, these silicon carbide particles possess a surface chemistry similar to silica. In certain embodiments, these silicon carbide particles are coated, particularly with a conformal coating of silica. The coating can be provided, for example, by depositing a silica coating on the silicon carbide particles using compositions capable of providing a silica coating, or by oxidation (e.g., thermal oxidation, chemical oxidation, and combinations thereof). The silicon carbide particles can be provided with a silica coating such that the coated silicon carbide particles behave similarly to silica particles, wherein the surface chemistry of the silicon carbide particles is similar to or identical to silica. Without being bound by theory, it is believed that the silicon carbide particles, which behave similar to silica, are more easily dispersed and will tend to be more stable in slurry compositions, resulting in decreased agglomeration. In some embodiments, particularly wherein the slurries are abrasive slurries, a silica coating is provided so as to "soften" the silicon carbide particles, thereby reducing defects and scratching normally associated with silicon carbide polished workpieces. Forming a silica coating by oxidation reaction has further been found to "blunt" or reduce sharp corners of the silicon carbide particles, thereby further reducing defects and scratching of the polished workpiece. Further, the material removal rate of the coated particles is improved using the coated silicon carbide particles since the underlying core is hard and the particles have a higher density.

As used herein, a "coating", when referring to a silica coating on silicon carbide particles, means generally that the silicon carbide particles have silica on at least a portion of their surface to an extent necessary to provide the silicon carbide particles with a surface chemistry similar to silica. The coating can be in the form of a particulate coating of silica on a silicon carbide core, a non-particulate, film-like coating of silica on a silicon carbide core, and combinations thereof. In some embodiments, at least about 50%, on average, of the surface of the particles is coated with silica. The amount of the surface of a given particle coated with silica can range from about 50% to about 100%, for example, at least about 60%, 70%, 80%, 90%, and 95%. The coating on a given particle can be uniform in thickness or, in some embodiments, it can vary in thickness on a given particle. Further, the thickness of coatings on the silicon carbide particles can be uniform or can vary among the particles.

In some embodiments, the silicon carbide is nano-sized α-silicon carbide having a surface potential similar to silica. In some embodiments, the nano-sized α-silicon carbide has an iso-electric point of about 2.2. The particles can have a hexagonal crystal structure. Without being bound by theory, it is believed that a low iso-electric point similar to silica indicates that the particles have silica on their surface, at least to some extent. In certain embodiments, the α-silicon carbide is provided with a coating of silica by, for example, depositing a silica coating on the silicon carbide particles using compositions capable of providing a silica coating, or oxidizing the particles (e.g., thermal oxidation, chemical oxidation, and combinations thereof). Thus, in some embodiments, the silicon carbide particles of the present invention comprise nano-sized α-silicon carbide which, as formed, possesses a low iso-electric point, in some cases similar to that of silica. The α-silicon carbide particles can be used as such or can be subjected to further oxidation/coating as desired.

Figure 1:
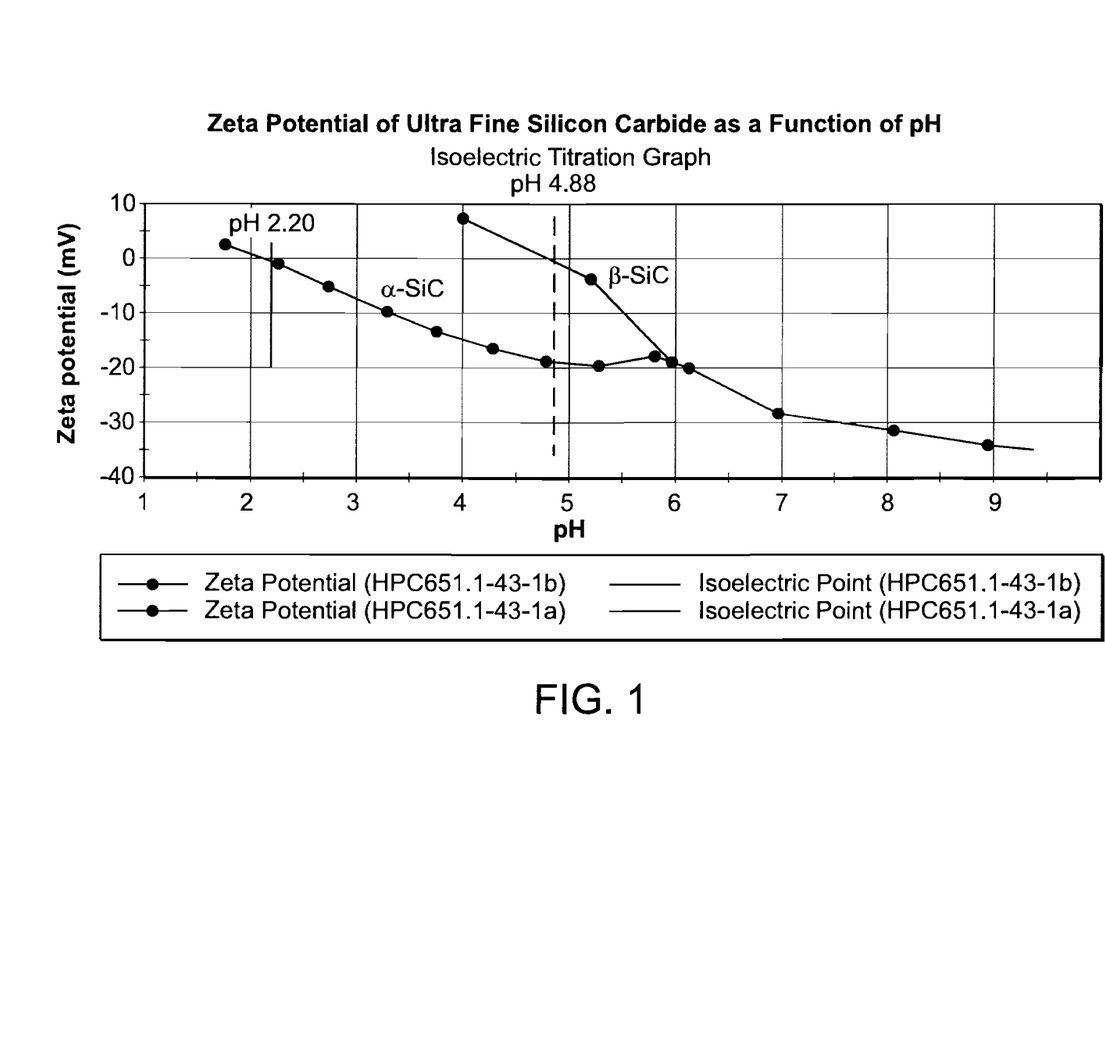
FIG. 1 shows the zeta potential of ultra fine silicon carbide as a function of pH.

In some embodiments, the silicon carbide is commercially available β-silicon carbide, which tends to have a higher iso-electric point than α-silicon carbide (see e.g., FIG. 1) and, thus, generally does not disperse quite as readily as the α-silicon carbide. In certain embodiments, the β-silicon carbide is coated, at least to some extent, with silica by, for example, depositing a silica coating on the silicon carbide particles using compositions capable of providing a silica coating, or oxidizing the particles (e.g., thermal oxidation, chemical oxidation, and combinations thereof). In some embodiments, the particles are coated to an extent that provides the particles with a surface chemistry (surface potential/iso-electric point) similar to that of silica.

Without being bound by theory, it is believed that when the slurries are abrasive slurries, the silica properties, for example, the surface chemistry or silica coating provided on the outer surface of the silicon carbide particles (as evidenced by the silica-like surface potential and iso-electric point), enhances CMP and other polishing processes by electrochemically attacking the surface of substrates (e.g. crystal, ceramic, and mineral substrates). In other words, the silica properties, "coating", or oxidized portion(s) of the silicon carbide particles, behaves like silica particles. The reacted layer of the substrate can then more easily be removed by the abrasive nature of the particles. Further, the silicon carbide particles exhibit very good dispersability at high pH. By adding silicon carbide to alumina at high pH, a stable slurry with well-dispersed, hard silicon carbide particles is obtained, which increases mechanical removal. While not wishing to be bound by theory, it is believed that since both surfaces (silicon carbide and alumina) have high negative charge, they repel each other and disperse well (i.e. electrostatic repulsion). Further, because the surfaces of the particles have oxide coatings (silicon dioxide, i.e. silica), chemical reaction is unhindered. As a result, a composite slurry containing alumina and silicon carbide particles, particularly silica coated silicon carbide particles, will provide a strong chemical reaction by alumina and a faster mechanical removal by the silicon carbide.

The alumina ($Al_2O_3$) abrasive particles of the present slurries can also be any conventional alumina particles. For example alpha alumina, gamma alumina, amorphous alumina, transitional alumina, fumed alumina and boehmite can be used. When the slurries are abrasive slurries, any conventional alumina particles that are used for abrasive/polishing applications can be used in the present slurries. As with the silicon carbide particles, the particle size of the alumina is not particularly limited and is selected based on the particular application of the slurry composition. For example, in abrasive slurries, the particle size of the alumina is selected accordingly, e.g. in view of the decrease in polishing rate as particle size is reduced and the potential for surface scratching as the particle size increases. In some embodiments, the alumina particles have a particle size no greater than about 500 nm. In some embodiments, the particle size of the alumina particles is no greater than about 200 nm. In other embodiments, the particle size ranges from about 40 nm to about 300 nm, and in some embodiments from about 70 nm to about 200 nm, and other embodiments from about 100 nm to about 150 nm.

The total amount of particles in the present slurry compositions, including the alumina and silicon carbide particles, is generally at least about 1% by weight of the slurry. In some embodiments, the total amount of particles is at least about 2% by weight, in some embodiments at least about 3% by weight, and in some embodiments at least about 4% by weight. In some embodiments, the total amount of particles in the slurry ranges from about 5% to about 10% by weight of the slurry, and in some embodiments from about 5% to about 30% by weight of the slurry. However, it is understood that the total amount of particles can be adjusted based on the use of the slurry. For example, wherein the slurry is an abrasive slurry, the total amount of particles can be adjusted based on factors such as the surface being polished and the ratio of soft ($Al_2O_3$) to hard (SiC) particles in the slurry. Thus, for example, if more aggressive polishing is desired, the total amount of particles can be increased and/or the ratio of hard to soft particles can be increased while increasing, maintaining, or decreasing the total amount of particles.

The amount of silicon carbide in the slurry generally accounts for at least about 0.3% by weight of the slurry, in some embodiments at least about 0.5% by weight, and in some embodiments at least about 1% by weight. In some embodiments, the amount of silicon carbide ranges from about 1% to about 5% by weight of the slurry. The total amount of alumina in the slurry generally accounts for at least about 0.7% by weight of the slurry, in some embodiments at least about 1%, and in some embodiments at least about 7%. In some embodiments, the total amount of alumina ranges from about 5% to about 30% by weight of the slurry. However, as set forth, depending on the particular application of the slurry, these ratios can be adjusted to provide the proper balance of each type of particle. For example, where the slurry is an abrasive slurry, depending on the particulars of the surface being polished and the desired rate and properties of the polishing process, these ratios an be adjusted to provide the proper balance of hard and soft particles. In general, for example, the amount of silicon carbide can be increased for harder surfaces, while the amount of alumina may can be increased for more delicate and softer surfaces. In one exemplary embodiment, the silicon carbide accounts for about 30% of the slurry, while the alumina accounts for about 70% of the slurry, with both materials having an average particle size within the range of 40-300 nm in optimally dispersed aqueous slurry.

The silicon carbide and alumina particles are dispersed within an aqueous medium that can contain any combination of conventional slurry ingredients such as solvents, pH adjusters, chelating agents, lubricants, corrosion inhibitors, surface modifiers, inhibiting agents, rheology agents, oxidizing agents, and deionized water. As used herein, "dispersed"

is understood to mean that the silicon carbide and alumina particles are distributed throughout the aqueous medium, preferably evenly distributed.

Rheology agent are generally included in slurries to increase the slurry viscosity and to structure the laminar flow of the slurry such that vertical fluid motion is reduced. Any conventional rheology agents can be used in the present slurry compositions, including, but not limited to, cross-linked acrylic polymers and water soluble polymers (WSPs). Some examples include modified cellulose derivatives, cellulose ethers, starch derivatives, pectin derivatives, polyacylamides, hydroxypropylcellulose, hydroxyethylcellulose, and carboxymethylcellulose.

Various oxidizing agents can be included in the slurry compositions. These agents generally include any substances which remove metal electrons and raise the atomic valence. Examples of oxidizing agents include, but are not limited to, hydrogen peroxide, urea hydrogen peroxide, monopersulfates, dipersulfates, peracetic acid, percarbonates, organic peroxides such as benzoyl peroxide, di-t-butyl peroxide, periodic acid, periodiate salts, perbromic acid, perbromate salts, perchloric acid, perchloric salts, perboric acid, perborate salts, permanganates, permanganate salts, hydroxylamine, ferric nitrate, and nitric acid.

Chelating agents can further be included in the slurry compositions. Such agents can be used, for example, in abrasive slurries wherein they chemically react with metal ions removed from the polished/planarized surface to form a soluble metal complex to minimize re-deposition of metal ions on the surface of the substrate. Any conventional chelating agents can be used and include, for example, one or more amine or amide groups (e.g. ethylenediaminetetraacetic acid, ethylenediamine, and methylformamide) and organic acids (e.g. iminodiacetic acid and oxalic acid).

Various corrosion inhibitors can further be included in the compositions. These materials, when provided in abrasive slurries, generally react with the fresh polished/planarized surface and/or oxidized surface to passivate the surface and prevent excessive etching of the surface during CMP. Any conventional corrosion inhibitors can be used, including, but not limited to, alkyl amines, imidazole, aminotetrazole, benzotriazole, mercaptobenzotriazole, 5-methyl-1-benzotriazole, benzimidazole, amino, imino, carboxy, mercapto, nitro, alkyl, urea and thiourea compounds and derivatives, etc. Dicarboxylic acids such as oxalic acid, malonic acid, succinic acid, nitrilotriacetic acid, iminodiacetic acid, and combinations thereof.

Various solvents conventionally used in slurries can further be included to provide a medium in which the particles are dispersed and in which the other components are incorporated. The solvents can be selected from any conventional solvents including, but not limited to, water, alcohols, such as isopropyl alcohol, methanol, ethanol, propanol, butanol, ethylene glycol, propylene glycol, glycerin, ketones, such as acetone, ethers, such as diethylether, tetrahydrofuran (THF), and water-alcohol solutions.

Surfactants can further be included in the abrasive slurries. Suitable surfactants include non-ionic, anionic, cationic, non-ionic, zwitterionic, amphoteric, and polyelectrolyte compounds. Examples of some surfactants for use in the present invention are disclosed in, for example, Kirk-Othmer, Encyclopedia of Chemical Terminology, 3rd Edition, Vol. 22 (John Wiley & Sons, 1983), Sislet & Wood, Encyclopedia of Surface Active Agents (Chemical Publishing Co., Inc. 1964), Ash, The Condensed Encyclopedia of Surfactants (chemical Publishing Co., Inc., 1989), Tadros, Surfactants (Academic Press, 1984), all of which are incorporated herein by reference. Some examples include salts of organic acids, alkane sulfates, alkane sulfonates, hydroxides, substituted amine salts, betaines, polyethylene oxide, polyvinyl alcohol, polyvinyl acetate, polyacrylic acid, polyvinyl pyrrolidone, polyethyleneinine, esters of anhydrosorbitols, quarternary such as tetramethyl ammonium halides, Cetyl trimethyl ammonium halides, nonyl ethers and combinations thereof.

In certain embodiments, the slurries are in the form of abrasive slurries suitable for use in various polishing and planarization processes including CMP, pre-polishing step for stock removal, texturing, etc. In accordance with the present invention, the rates of chemical and mechanical interaction are appropriately balanced to provide optimal polishing performance. It has been found that mechanical abrasion varies with the type of abrasive particles, abrasive particle size, abrasive particle concentration, and particle size distribution. Thus, the present slurry compositions comprise abrasive particles having suitable particle size, concentration, and particle size distribution to provide the appropriate levels of mechanical interaction. Further, the slurry composition is provided with a mixture of two types of abrasive particles having different degrees of hardness, wherein the ratio of the mixture is adjusted so as to provide the appropriate levels of mechanical interaction. In some embodiments, the first type of abrasive particles have a hardness that is harder than the work surface being polished, while the second type of abrasive particles have a hardness that is softer than the work surface being polished. Further, the slurry compositions can be used in a CMP process wherein the operational variables, such as applied pressure and velocity of the polishing pad, are controlled to provide the desired polishing and planarization properties.

In some embodiments, the abrasive slurry compositions of the present invention comprise a mixture of silicon carbide abrasive particles and alumina abrasive particles, at high pH. The combination of silicon carbide and alumina is particularly advantageous because the hardness of silicon carbide is much higher than alumina, and gives a stable well dispersed slurry at higher pH values. The silicon carbide, in some applications, is ultra-fine (no greater than 300 nm average particle size). It has been found that the addition of silicon carbide to alumina provides a desired surface finish to C-plane sapphire much more quickly than the use of alumina slurries alone, and, thus, reduces the polishing time of C-plane sapphire wafers relative to the use of alumina slurries alone. Without being bound by theory, it is believed that the surface of SiC is slightly oxidized and, thus, reacts with the sapphire surface to help removal. It has been found that because the surface charges on the fine silicon carbide particles are highly negative at higher pH values (see FIG. 1), silicon carbide can be added to any slurry which has a high pH and will disperse readily. Alumina particles are not stable at high pH, and, thus, a surfactant can be added to disperse the particles.

In some embodiments of the invention, the silicon carbide is present in the slurry in an amount that reduces the time to reach a target Ra in C-plane sapphire. In some embodiments, the present compositions contain silicon carbide in an amount sufficient to enhance the removal rate of the R-plane sapphire such that a target Ra is reached faster, for example at least about 10% faster relative to the polishing process using an alumina slurry that does not contain silicon carbide, under similar polishing conditions.

The pH of the present slurry compositions may be at any suitable value that is efficacious for the specific use of the slurry. For example, when used as an abrasive slurry, the pH can be determined in light of the specific polishing operation employed. For example, for polishing sapphire, the pH can range from about 8 to about 12. In an exemplary embodiment, the pH ranges from about 111 to about 12, for example, in one embodiment the pH is about 11.2. To provide a desired pH value, one or more pH adjusting agents can be included in the compositions. The pH adjusting agents can include, for example, any of various bases, such as potassium hydroxide (KOH) and ammonium hydroxide, sodium hydroxide (NaOH) or inorganic and/or organic acids, such as acetic acid, phosphoric acid, or oxalic acid.

In general, the compositions of the present invention can be made by forming an alumina slurry and adding silicon carbide particles to the alumina slurry. The pH of the alumina slurry can be adjusted as desired before or during the addition of silicon carbide.

The present invention is further illustrated by the following examples which should not be construed as limiting in any way. The contents of all cited references (including literature references, issued patents, published patent applications) as cited throughout this application are hereby expressly incorporated by reference. The practice of the present invention will employ, unless otherwise indicated, conventional techniques, which are within the skill of the art. Such techniques are explained fully in the literature.

EXAMPLES

A slurry containing alumina, having an average particle size of 0.2 μm was prepared. Composite slurries containing 7% by weight alumina and 3% by weight silicon carbide in the slurry were also prepared.

Figure 2:
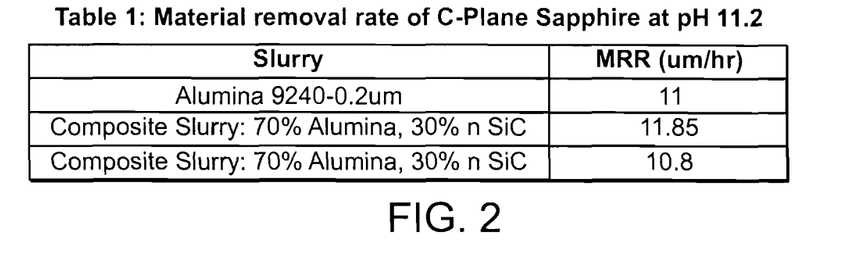
FIG. 2 is a graph showing the removal rate vs. polishing time for alumina slurries and for composite slurries of alumina and silicon carbide in accordance with the Example.
Figure 3A:
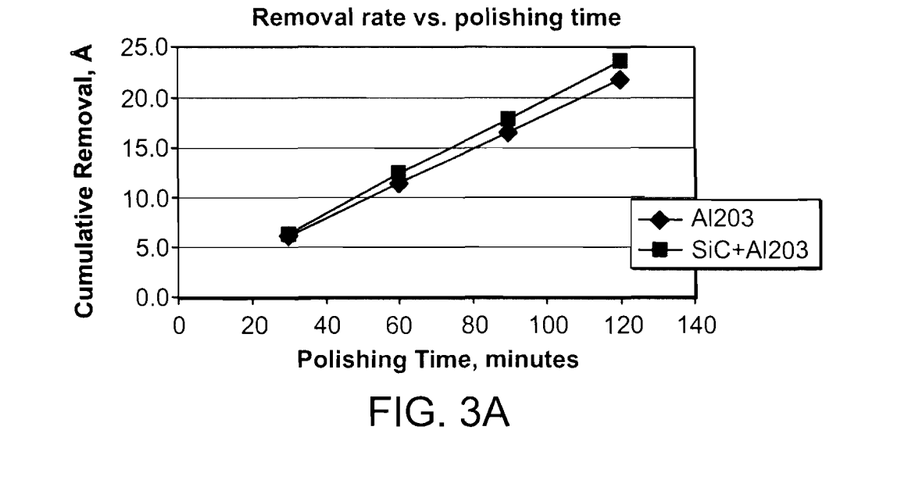
FIG. 3 is a graph showing the surface finish vs. polishing time for alumina slurries and for composite slurries of alumina and silicon carbide in accordance with the Example.
Figure 3B:
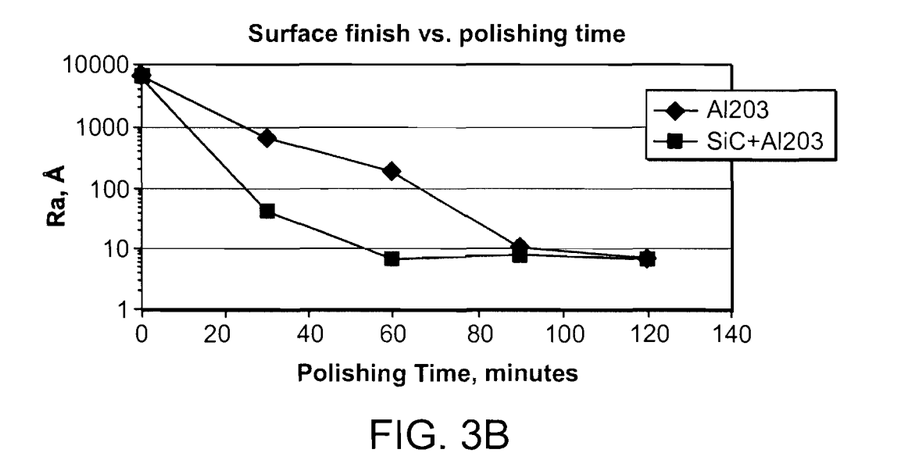

The polishing of a lapped C-plane sapphire sample was carried out on a Buehler Ecomet 4 polisher under the following conditions where the pressure on the sample being polished was 4 psi. The platen speed on the polisher was 400 RPM (anti-clockwise) and the sample carrier speed was 70 RPM (clockwise). The polishing was carried out on a Suba $H_2$ pad sourced from Rohm & Haas Electronic Materials with a slurry flow rate of 40 ml/min for stand alone alumina slurry and the composite slurry containing alumina and nano silicon carbide. Before the onset of polishing the sample weight of C-plane sapphire was measured in grams up to four decimal places and then polished for a period of 2 hours. The mass loss was measured every half hour and an average material removal rate per hour reported as shown in Table 1 and cumulative material removal shown in FIG. 2 for the stand alone alumina and composite slurries of alumina and nano silicon carbide. The surface finish ($R_a$) in angstroms was measured on the sample every half hour using an interferometer and the data is shown in FIG. 3. As demonstrated by the results in FIG. 2, the removal rate is increased. As demonstrated by the results in FIG. 3, the surface roughness of the C-plane sapphire was reduced at a much faster rate with the silicon carbide/alumina composite slurries. This results in substantially reduced polishing times required to reach a target surface finish.

What is claimed is:

1. An abrasive slurry composition
comprising abrasive particles dispersed in an aqueous medium,
the abrasive particles comprising
a mixture of silicon carbide particles in an amount of 1 wt % to 5 wt % and alumina particles in an amount of at least 1 wt % based on the total weight of the slurry composition, and a total amount of abrasive particles in an amount of 2 wt % to 10 wt %,
wherein the silicon carbide particles comprise a silica coating on at least 50% of their surface;
wherein both the silicon carbide particles and the alumina particles have an average particle size from 40 nm to 300 nm;
wherein the pH of the slurry composition ranges from about 8 to about 12; and
wherein the abrasive slurry composition has a surface roughness reduction rate for polishing C-plane sapphire that is at least 10% increased compared to a respective alumina slurry composition without the silicon carbide particles.

2. The abrasive slurry composition of claim 1 wherein the silicon carbide particles have an average particle size no greater than 200 nm.

3. The abrasive slurry composition of claim 1 wherein the alumina is selected from alpha alumina, gamma alumina, amorphous alumina, transitional alumina, and boehmite.

4. The abrasive slurry composition of claim 1 wherein the alumina particles have an average particle size no greater than 200 nm.

5. The abrasive slurry composition of claim 1, wherein the composition comprises about 30 wt % silicon carbide particles and about 70 wt % alumina particles based on the total weight of the particles.

6. The abrasive slurry composition of claim 1 wherein the silicon carbide particles have an iso-electric point of about 2.2.

7. The abrasive slurry composition of claim 1, wherein the silica coating is formed by oxidation of the silicon carbide particles.

8. A method for polishing sapphire comprising:
abrading the sapphire surface with the abrasive slurry composition of claim 1.

9. The method of claim 8 wherein the silica coating is formed by oxidation of the silicon carbide particles.

10. An abrasive slurry composition comprising:
abrasive particles dispersed in an aqueous medium, the abrasive particles consisting essentially of a mixture of silicon carbide particles in an amount of 1 wt % to 5 wt % and alumina particles in an amount of at least 1 wt % based on the total weight of the slurry composition, and a total amount of abrasive particles of 1 wt % to 10 wt % based on the total weight of the slurry composition, wherein both the silicon carbide particles and the alumina particles have an average particle size from 40 nm to 300 nm; and the pH of the slurry composition ranges from about 8 to about 12.

11. The abrasive slurry composition of claim 10 wherein the silicon carbide particles comprise particles having a silica coating on at least 50% of their surface.

12. The abrasive slurry composition of claim 10 wherein the silicon carbide particles have an average particle size no greater than 200 nm.

13. The abrasive slurry composition of claim 10 wherein the alumina particles have an average particle size no greater than 200 nm.

14. The abrasive slurry composition of claim 10 wherein the alumina is selected from alpha alumina, gamma alumina, amorphous alumina, transitional alumina, and boehmite.

15. The abrasive slurry of claim 10 wherein the silicon carbide particles have an iso-electric point of about 2.2.

16. The abrasive slurry composition of claim 1, wherein the silicon carbide particles are present in an amount of 1 wt % to 3 wt % based on the total weight of the slurry.

17. The abrasive slurry composition of claim 10, wherein the silicon carbide particles are present in an amount of 1 wt % to 3 wt % based on the total weight of the slurry.

18. The abrasive slurry composition of claim 1, wherein the abrasive slurry composition is capable of achieving a c-plane sapphire surface roughness of less than 10 angstroms within 60 minutes of polishing time.

\* \* \* \* \*